Nov. 27, 1928.    K. DÜRR    1,693,558
AUTOMATIC MANUFACTURING OF BEAD CHAINS
Filed Oct. 18, 1926
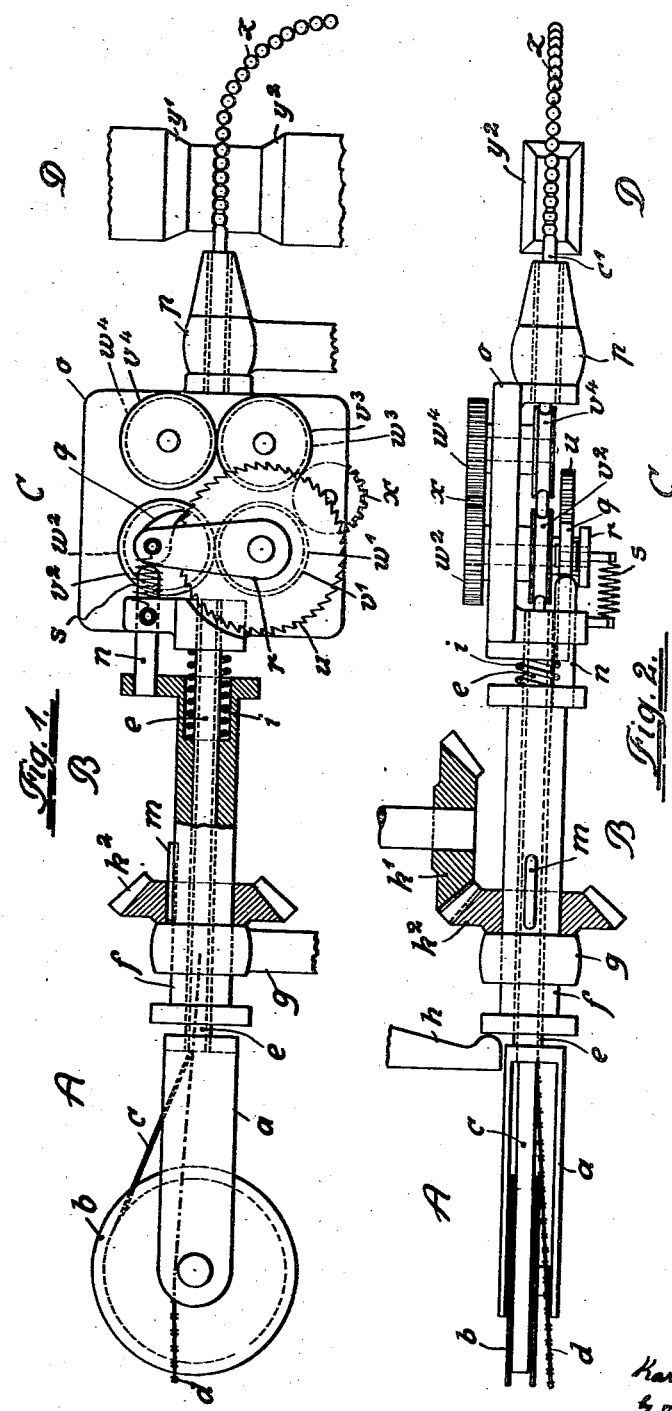

Patented Nov. 27, 1928.

1,693,558

UNITED STATES PATENT OFFICE.

KARL DÜRR, OF PFORZHEIM, GERMANY.

AUTOMATIC MANUFACTURING OF BEAD CHAINS.

Application filed October 18, 1926, Serial No. 142,443, and in Germany October 10, 1925.

For the manufacturing of bead chains methods and apparatus are known in which the hollow spheres or beads and the dumbbells like intermediate elements are made from metal band by means of moulding nozzles and beading machines. The moulding nozzles are submitted to very strong wear and they require, therefore, a permanent and careful observation and repeated regrinding in order to supply perfect works.

These inconveniences are avoided by the manufacturing method according to the invention as for transforming into a metal tube the metal band designed for producing the hollow spheres or beads moulding rollers are used which have large working surfaces and which are consequently submitted to comparatively very little wear. At the same time the wire for the intermediate elements is fashioned on a beading machine working parallel to the other apparatus, and the fashioned wire is fed together with the metal band into the apparatus for forming the metal tube, said metal tube and the wire for the intermediate elements being fed together to the beading machine for the formation of the hollow spheres or beads, the finished bead chain being delivered from said beading machine.

An apparatus for carrying out the new manufacturing method is shown, by way of example, in the accompanying drawings in which:—

Fig. 1 is an elevation partly in section.

Fig. 2 is a plan view.

The apparatus consists of a feed mechanism A, a driving mechanism B, a moulding mechanism C and a beading machine D. The metal band $c$ is fed over a roller $b$ mounted in a fork-shaped holder $a$ to a hollow shaft $e$ together with the wire $d$ for the intermediate elements which has been fashioned on a beading machine not shown in the drawing. The metal band $c$ and the wire $d$ are supplied through the hollow shaft $e$ to the moulding apparatus C.

A sleeve $f$ slidably mounted on the hollow shaft $e$ carries the driving mechanism B. The sleeve $f$ is supported by a bracket $g$ and intermittently advanced by a cam lever $h$ (Fig. 2) through a distance corresponding to the size of a hollow bead and returned into the initial position by the action of a pressure spring $i$. To this sleeve $f$ a rotating movement is communicated by two bevel wheels $k'$, $k^2$. The bevel wheel $k^2$ is coupled to the sleeve $f$ by wedge and groove $m$ so that it rotates said sleeve without interfering with the movement of the same in longitudinal direction. The longitudinal shifting movement of sleeve $f$ is transmitted upon the moulding mechanism C by a ram $n$. The moulding mechanism is mounted on a plate $o$ which is carried at the one end by the hollow shaft $e$ and at the other end by a bearing $p$. The ram $n$ operates a ratchet pawl $q$ mounted on a lever $r$ and controlled by a spring $s$ which pulls said pawl back into the initial position after every feeding movement. The ratchet pawl $q$ rotates a ratchet wheel $u$ mounted on the same axle as a moulding roller $v'$ and a toothed wheel $w'$. This toothed wheel $w'$ rotates, through the intermediary of a pinion $x$, toothed wheels $w^2$, $w^3$ and $w^4$ and the moulding rollers $v^2$, $v^3$ and $v^4$ rigid with said toothed wheels. By the action of these moulding rollers $v'$, $v^2$, $v^3$ and $v^4$ the metal band $c$ is transformed into a metal tube $c'$ inclosing the wire $d$ for the intermediate elements. The metal tube $c'$ with the wire $d$ is conveyed to the beading machine D, the rotating movement of sleeve $f$ being communicated by the ram $n$ to the moulding mechanism and consequently to the metal tube $c'$ so that the same rotates between the swaging dies $y'$, $y^2$, of the beading machine D whilst presenting successive faces to the action of said swaging dies being fashioned. The narrowed joints between the beads which are still hanging the one on the other and the narrowed portions of the inner wire, on which the hollow beads are mounted, are, by according adjusting of the machine, displaced the one with regard to the other half the length of one link so that the separating points of the wire are situated in the beads, the separating points between two beads being situated between the thickened ends of the wire-sections. The work prepared in this manner is then repeatedly bent to and fro between an undulated swage not shown in the drawing, whereby the separating points between the beads and the wire-sections are broken so that a chain is formed from the beading machine D. When passing through the swaging dies the beads are still connected to the tube $c'$ formed between the rollers $v'^{-4}$ from the bead $c$. This tube $c'$ is turned by the mechanism so that also the beads are turned in the swaging dies. Only when a bead is delivered from the dies it is severed.

I claim:—

In a machine for manufacturing bead-chains to which are fed simultaneously a metal-band from which the beads are to be formed and a wire which on a parallel working machine has been shaped to form the intermediate links between the beads, comprising in combination with swaging dies two pairs of moulding rollers arranged one pair behind the other, means for simultaneously feeding to said pairs of moulding rollers a metal band and a fashioned wire the latter being rolled into said metal band when the same is being rolled to form a tube, and means for rotating said rollers at uniform circumferential speed to give to said metal tube and wire the rotating movement which is necessary for the forming of beads presenting successive faces to the action of said swaging dies.

In testimony whereof I affix my signature.

KARL DÜRR.